United States Patent [19]

McNaught

[11] 4,177,626
[45] Dec. 11, 1979

[54] CROP GATHERING APPARATUS

[75] Inventor: James B. McNaught, St. Germain-en-Laye, France

[73] Assignee: Massey-Ferguson Services N.V., Curacao, Netherlands Antilles

[21] Appl. No.: 896,667

[22] Filed: Apr. 17, 1978

[30] Foreign Application Priority Data

Apr. 21, 1977 [GB] United Kingdom ............... 16714/77
May 11, 1977 [GB] United Kingdom ............... 19694/77

[51] Int. Cl.² ............................................. A01D 45/00
[52] U.S. Cl. .................................... 56/14.5; 198/513; 198/669; 198/676
[58] Field of Search ............... 198/513, 676, 671, 669, 198/657, 518, 506, 548, 558, 666, 667, 668; 56/14.5

[56] References Cited

U.S. PATENT DOCUMENTS 2,813,704  11/1957  Mackissic ...................... 198/558 X
3,438,584   4/1969  Klein ............................. 198/669

FOREIGN PATENT DOCUMENTS 2556688  7/1976  Fed. Rep. of Germany ........... 198/513

*Primary Examiner*—Robert B. Reeves
*Assistant Examiner*—Douglas D. Watts
*Attorney, Agent, or Firm*—Robert L. Farris

[57] ABSTRACT

Crop gathering table for a combine has an auger to move crop laterally inwards towards the center of the table. The auger has a central shaft carrying helical flights, and discharge fingers to discharge crop through an opening in the rear of the table. A series of crop feeding plates mounted on the auger and extending lengthwise of it between portions of the helical flights, promote smooth flow of crop below the auger shaft.

4 Claims, 6 Drawing Figures

CROP GATHERING APPARATUS

This invention relates to crop gathering apparatus suitable for use in harvesting grain crops, for example a conventional table for a combined harvesting and threshing machine or combine. The invention is particularly, but not exclusively, applicable to crop gathering apparatus comprising a table to receive cut crop, a crop conveying belt mounted on the table, and an auger mounted on the table adjacent the discharge end of the belt to receive crop therefrom. An example of such apparatus is disclosed in the published West German Pat. specification No. 2,556,688 in the name of Massey-Ferguson Services N.V.

We have ascertained that improvements can be effected in the feeding efficiency of the auger of such crop gathering apparatus generally, and more particularly in the efficiency of feeding of crop between the crop conveying belt and the auger mentioned above, and it is an aim of the present invention to provide crop gathering apparatus offering such improvements.

According to the invention there is provided crop gathering apparatus suitable for use in harvesting grain crops, said crop gathering apparatus comrising:

a table to receive cut crop, said table defining the gathering width of the crop gathering apparatus;

an auger mounted on the table to receive crop gathered by the table, the auger extending laterally with respect to the direction of operative forward motion of the crop gathering apparatus;

drive means for said auger, the drive means being capable of rotating the auger about the laterally extending longitudinal axis of the auger;

a crop outlet opening formed in said table; and said auger comprising a central shaft, a helical flight mounted on said shaft, the direction of the helical flight being such as to convey crop towards said crop outlet opening upon rotation of the auger by said drive means, and crop discharge means to promote discharge of crop through said outlet opening;

characterized by at least one crop feeding plate mounted on said auger and rotatable therewith, the crop feeding plate extending lengthwise of the central shaft of the auger between portions of said helical flight.

The provision of the crop feeding plate mounted on the auger and rotatable therewith promotes the smooth passage of crop below the central shaft of the auger.

An embodiment of the invention will now be described by way of example with reference to the accompanying drawings in which.

Figure 1:
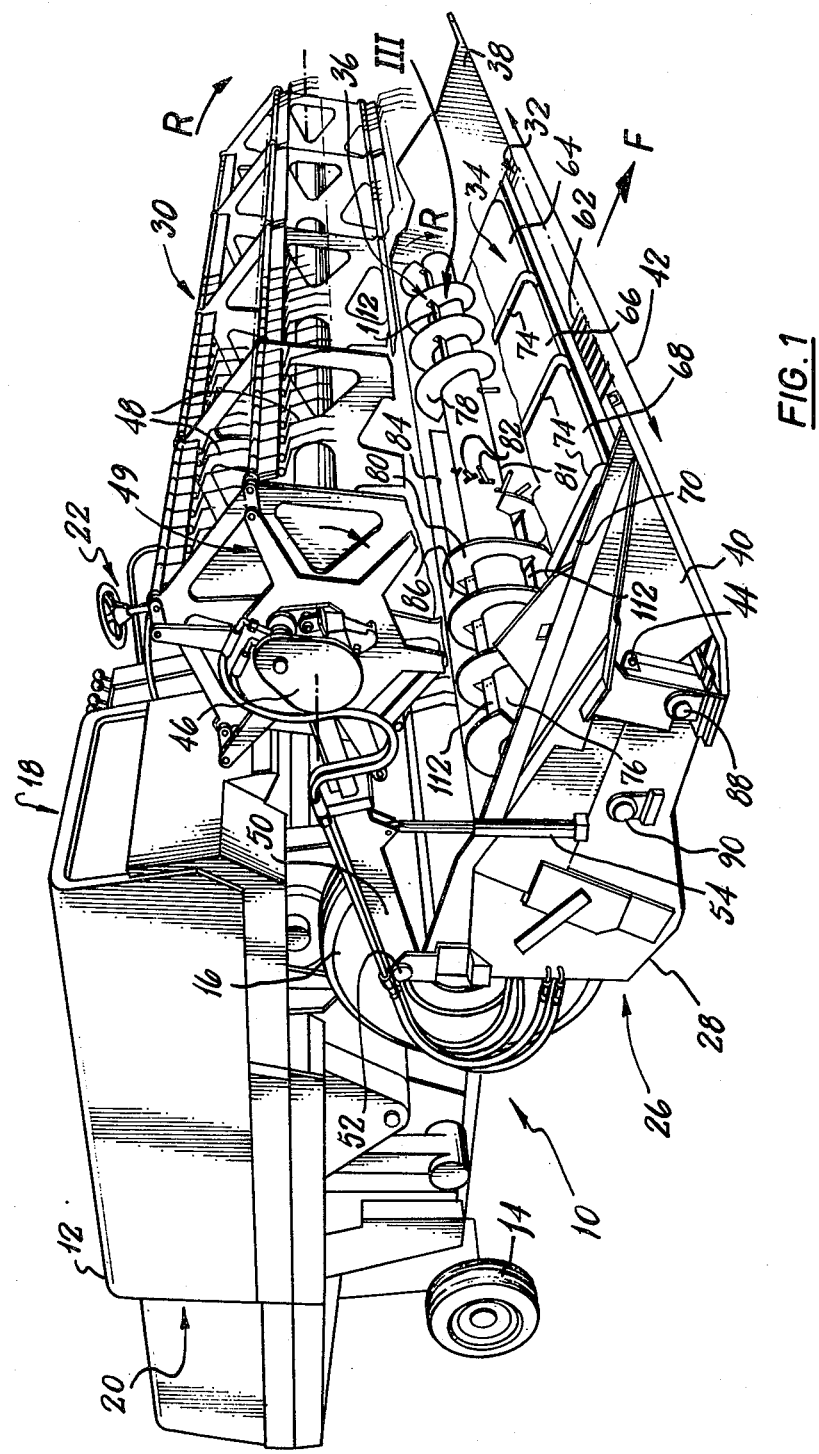
FIG. 1 shows a perspective view from the front and one sie of a combined harvesting and threshing machine or combine, incorporating crop gathering apparatus according to the invention.
Figure 2:
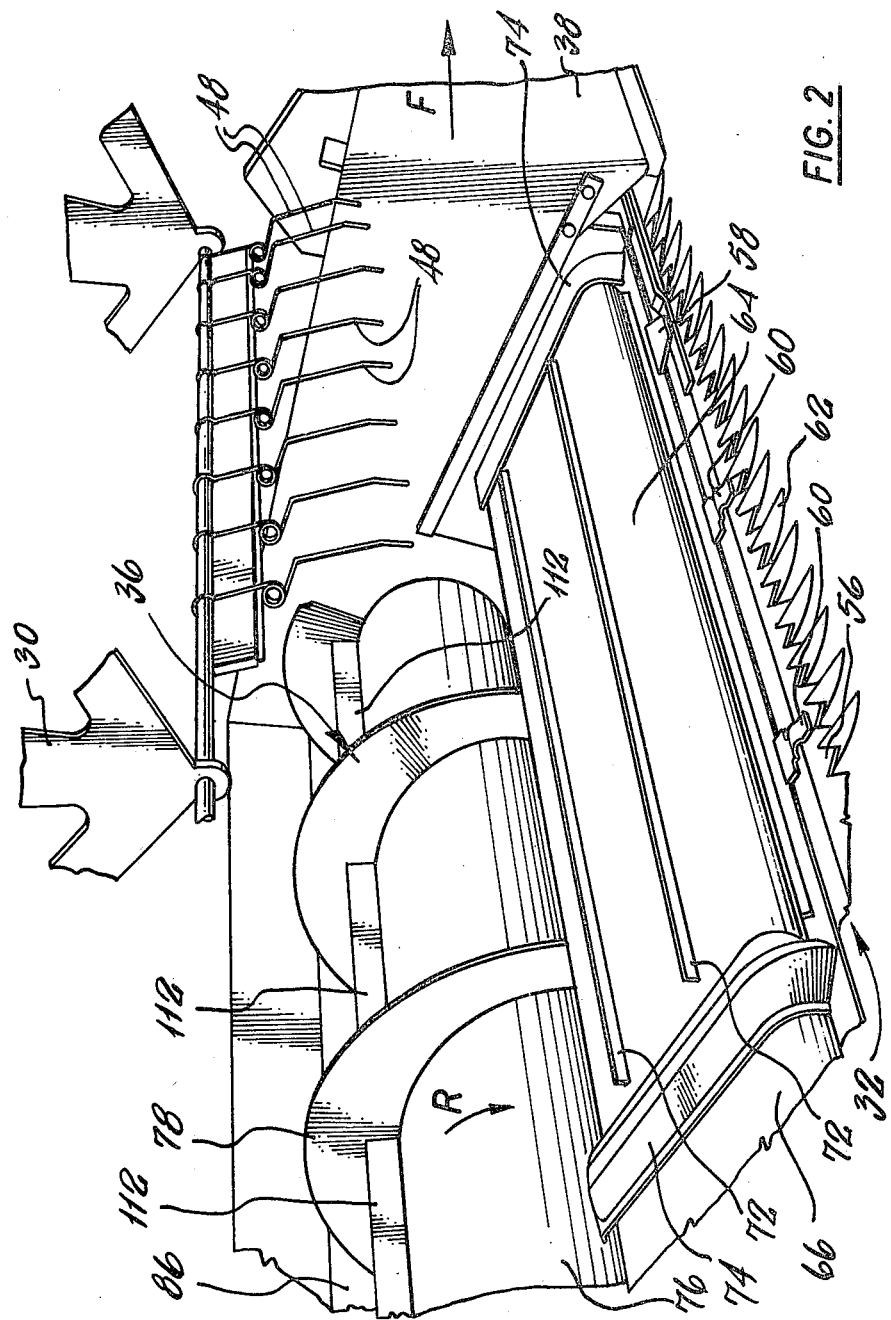
FIG. 2 shows a perspective view of a portion of the crop gathering apparatus of FIG. 1, the direction of viewing being substantially the same as in FIG. 1.

As shown in FIG. 1 a combine 10 comprises a main body 12 mounted on steerable rear wheels 14 and driven front wheels 16 and constituting a harvesting vehicle. The main body houses an engine at 18 and conventional grain crop threshing and separating apparatus (not shown) such as a threshing cylinder and concave, straw walkers and a shaker shoe. The main body also provides a grain tank 20 and an operator's platform 22.

Mounted at the fromt of main body 12 on the housing (not seen in the drawings) of a conventional chain and slat table elevator, is crop gathering apparatus 26. The crop gathering apparatus comprises a table 28 to receive cut crop, a reel 30, crop cutting means in the form of a cutterbar 32, crop conveying apparatus 34 and an auger 36.

The elevator housing (not shown) is pivotally mounted on main body 12 at its rear end in the usual manner, and hydraulic rams (not shown) are provided to raise and lower its forward end. The forward end of the housing has conventional attachment means (not shown) whereby table 28 is mounted thereon and can be quickly detached and re-attached.

Table 28 has end walls 38, 40 defining the crop gathering width 42 of the table, and each end wall has attachment means 44 for crop dividers (not shown).

Reel 30 is more fully described in published West German patent specification No. 2,708,843 and has drive means in the form of a hydraulic motor 46, tines 48, and a mechanism 49 for maintaining the tines in a downwardly projecting attitude as the reel rotates. The reel is mounted on support arms 50, one at each end, which are pivotally connected to table 28 at 52 whereby the reel can be raised and lowered by means of hydraulic rams 54 in the usual manner. Reel 30 can also be adjusted in the fore and aft direction F by means of support arms 50 as is more fully described in published West German patent specification No. 2,646,730.

Figure 3:
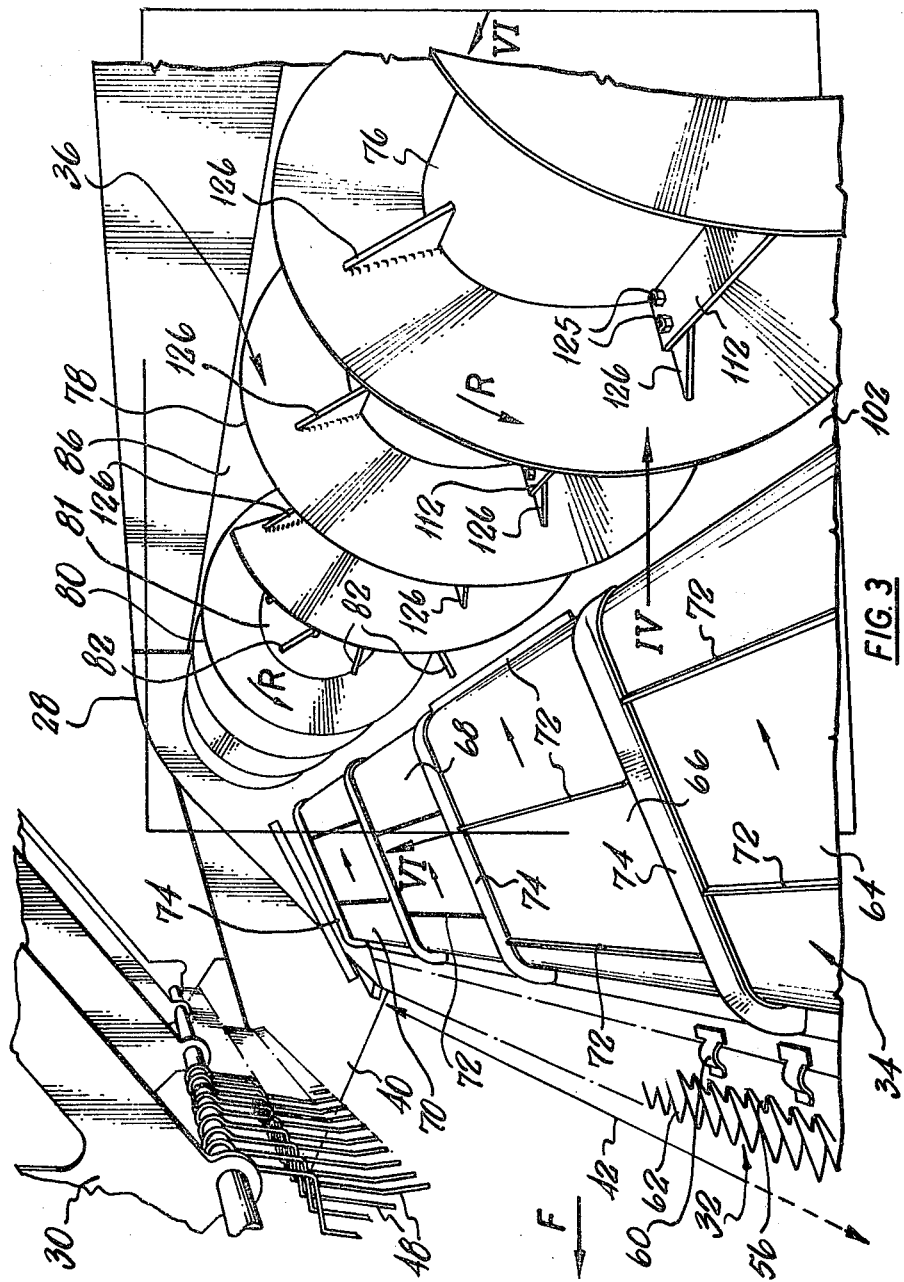
FIG. 3 shows another perspective view of a portion of the crop gathering apparatus of FIG. 1, the direction of viewing being indicated by arrow III in FIG. 1.

Cutterbar 32 is of conventional form comprising a reciprocable knife 56 having a serrated sharpened cutting edge, knife guides 58, 60, and forwardly-projecting fingers 62, As shown in FIGS. 1 and 3, crop conveying apparatus 34 comprises four crop conveying belts 64, 66, 68 and 70 arranged side by side across the crop gathering width 42 of table 28 to convey cut crop rearwards to auger 36. Each belt has a series of spaced laterally extending rubber ribs 72 secured to its outer surface. A series of profiled sheet metal guards 74 cover the gaps between successive belts and at the remote ends of the outer two belts 64 and 70, to prevent entry of crop material.

Auger 36 is mounted on table 28 adjacent the discharge ends of the crop conveying belts 64, 66, 68 and 70 and is positioned to receive crop therefrom. The auger extends laterally with respect to the direction F of operative forward motion of the crop gathering apparatus and comprises a central shaft in the form of a sheet metal tube 76 and two helical flights 78, 80 mounted on the tube at opposite ends thereof. Flights 78, 80 are of opposite hand or direction and spaced apart by a central portion 81 of the tube from which project a series of crop feeding fingers 82 constituting crop discharge means.

Drive means is provided for auger 36 in the form of a chain drive (not shown) located in a housing on the outer side of left hand table end wall 38. The drive rotates the auger about its laterally-extending longitudinal axis 83 in an anticlockwise direction (arrow R) as viewed from the left hand side of the crop gathering apparatus 34, as in FIGS. 3 and 6, so that the crop passes below tube 76. Fingers 82 extend, feather and retract in the usual way as the auger rotates, to discharge crop to the table elevator through a rectangular crop outlet opening 84 (see FIG. 6) formed in the rear wall 86 of table 28 just below the main table support beam 87.

The four crop conveying belts 64, 66, 68 and 70 are each trained round training members in the form of a pair of spaced-apart end rollers 88, 90 in an upper run 92 and a lower run 94.

Figure 6:
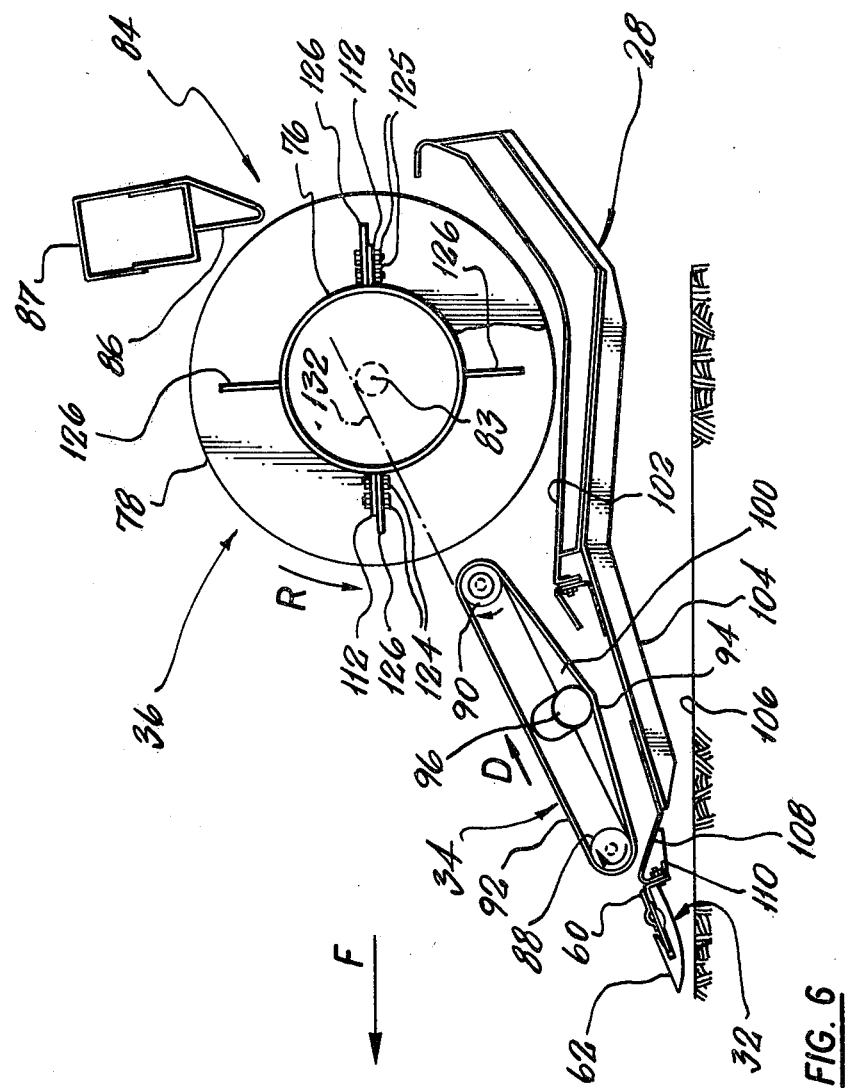
FIG. 6 shows a cross section through the crop gathering apparatus of FIGS. 1 to 5, the section being taken in the plane indicated by arrows VI—VI in FIG. 3.

Drive means in the form of a chain and sprocket drive (not shown) connected to rear rollers 90 is provided so as to drive the upper runs of the belts rearwards with respect to the direction F of operative forward motion of combine 10, as indicated by arrow D in FIG. 6.

Belt guide means is provided for each of the belts 64, 66, 68, 70 so as to maintain each belt in its correct position along the length of rollers 88, 90, i.e. to centralize each belt to ensure that it runs straight and does not move sideways.

The belt guide means is more fully described in our British patent specification No. 1,501,639. It suffices for present purposes to say that it comprises a pair of position-adjustable guide rollers 96 (see FIG. 6) for each belt. Each roller is positioned in the region of one edge of its belt and between the upper and lower runs 92 and 94 of the belt for rolling contact with the upper or inner surface 100 of the belt in lower run 94.

As shown in FIG. 6, table 28 has a floor 102 and a series of skids 104 engageable with the ground 106 are secured to the lower surface of the floor. The skids also serve to stiffen the table.

The forward end of floor 102 has secured thereto an extension piece 108 having a downwardly extending flange 110 on which cutterbar 32 is mounted.

Further details of the structure of auger 36 will now be described.

As indicated above, the directions or "hands" of helical auger flights 78 and 80 are such that upon rotation of auger 36 in direction R, the flights convey crop received from the crop conveying belts 64 to 70, towards the crop outlet opening 84 in the rear wall 86 of table 28.

As shown in all the drawings, a series of crop feeding plates 112 are mounted on auger 36 and rotatable therewith, the plates extending lengthwise of the central shaft 76 of the auger parallel to the auger axis 83 between successive portions of the helical flights 78 and 80 thereof.

Figure 5:
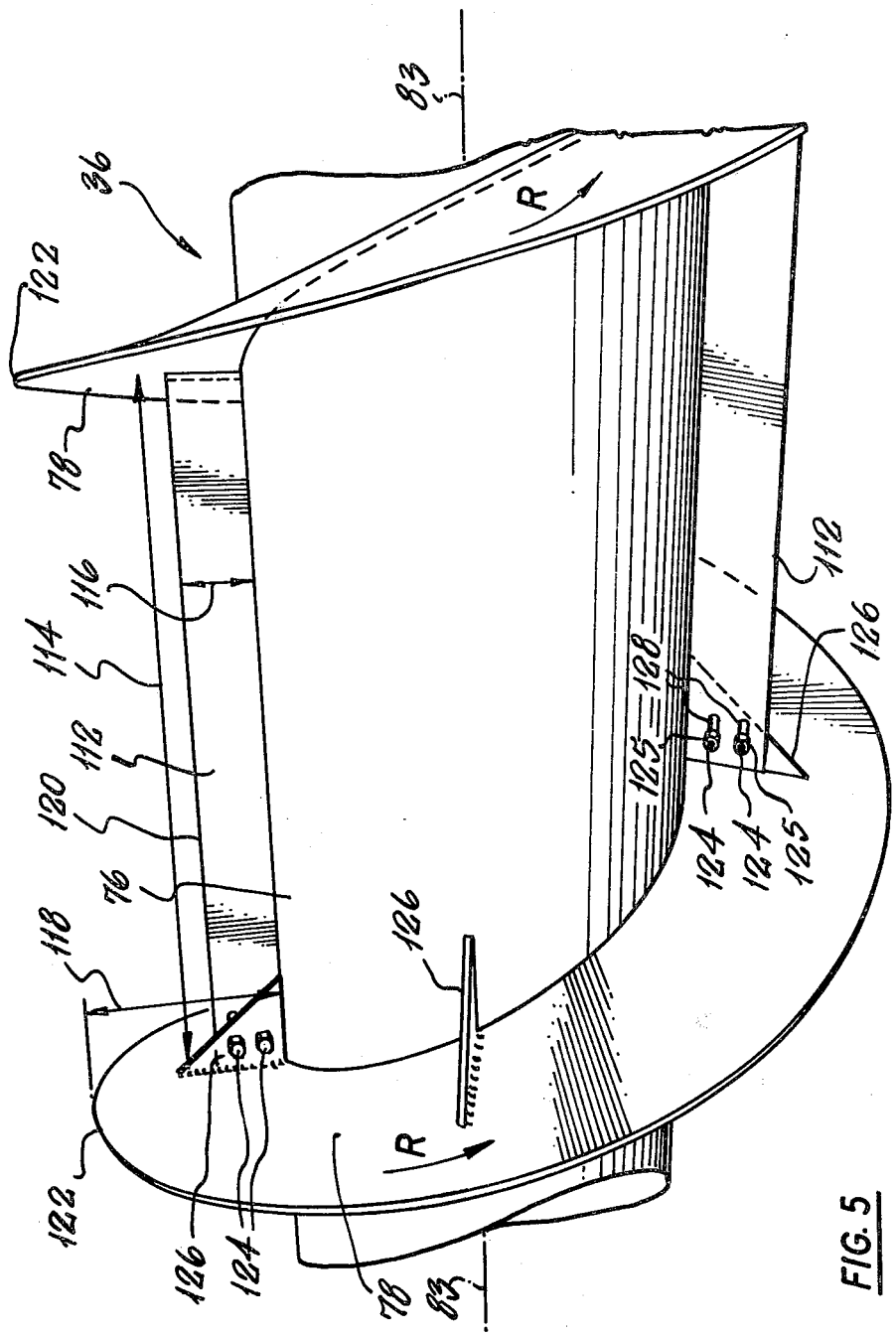
FIG. 5 shows a view similar to that of FIG. 4 but with the auger rotated through 90 degrees about its longitudinal axis, from its position in FIG. 4.

Referring to FIG. 5, each crop feeding plate 112 is in the form of a flat metal plate of length 114 corresponding to the pitch of the auger flights 78 and 80 and of width or depth 116 (50 millimeters) less than half the width or depth 118 (147 millimeters) of the auger flights. Thus the outer edge 120 of each crop feeding plate lies radially inwardly of the outer edge 122 of its helical auger flight 78 or 80 by a distance measured in the radial direction (with respect to auger axis 83), greater than the width of the crop feeding plate 112.

Figure 4:
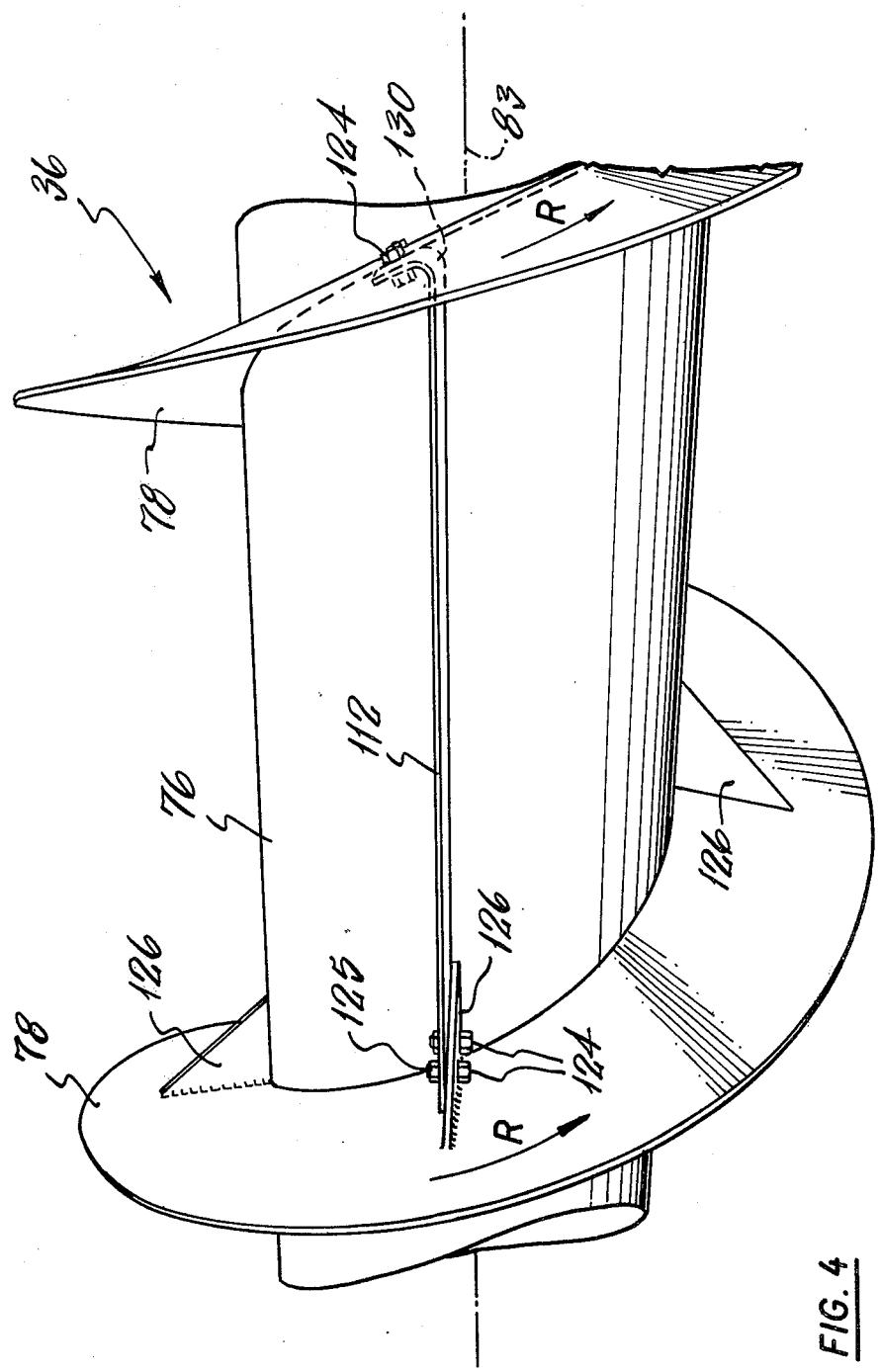
FIG. 4 shows a front elevation view of a portion of a crop conveying auger mounted on the crop gathering apparatus of FIGS. 1 to 3, the direction of viewing being indicated by arrow IV in FIG. 3.

The crop feeding plates 112 are each detachably mounted on auger 36 by pairs of bolts 124 and nuts 125 at each end. At one end, each plate is secured to one of a series of generally triangular fillet plates 126 welded to auger shaft 76 and to the auger flight 78 or 80. Appropriate holes are formed in the fillets, and slots 128 are formed in the crop feeding plates 112 to receive the bolts 124. At the other end, each crop feeding plate is formed with a flange 130 (FIG. 4) adapted to abut a portion of the auger flight and formed with apertures for the bolts 124.

As shown in FIG. 6, fillets 126 which secure the auger flights 78 and 80 to auger shaft 76 are provided at 90 degree intervals along the full length of each flight. However, the crop feeding plates 112 are provided at 180 degree intervals along the full length of each flight and thus are secured to every alternate fillet plate and are arranged at diametrically opposed positions on opposite sides of shaft 76.

In use, crop cut by cutterbar 32 falls headfirst onto crop conveying belts 64 to 70. Reel 30 assists in the smooth passage of crop onto the belts. The crop is delivered from the belts in the direction indicated in FIG. 6 by broken line 132, and as auger 32 rotates, crop feeding plates 112 gently but firmly push the crop downwards so that it immediately begins to pass smoothly below central shaft 76 and is thereupon acted on by helical flights 78 and 80 and fed laterally inwards towards the crop outlet opening 84 where the auger fingers 82 pass the crop through the opening for threshing and separation in the main body 12 of combine 10.

The principal advantage provided by the above embodiment of the invention is thus the smooth passage of crop from belts 64 to 70 below auger shaft 76, thereby avoiding uneven feeding which can occur if long-stemmed crop becomes lodged against (or leans against) auger shaft 76 and does not pass below the shaft until the auger flight 78 or 80 has pushed it over, laterally. Such hesitation in the feeding of crop is reduced or avoided by the above embodiment of the invention.

Among modifications which could be made in the above embodiment which nevertheless fall within the scope of the invention as defined by the claims are:

1. the use of much longer crop feeding plates extending through slots in the auger flights;
2. the use of deeper (wider) crop feeding plates;
3. distribution of the crop feeding plates at intervals of greater or less than 180 degrees, for example at 90 degree intervals;
4. the use of non-axial crop feeding plates, e.g. by giving them a slightly helical form;
5. the use of paddles, plates or the like as crop discharge means on auger 36 in place of fingers 82 for feeding crops through outlet opening 84 in the rear of the table;
6. the use of auger 36 in a conventional combine table not having belt type conveying apparatus 34 i.e. the deletion of apparatus 34 in the above embodiment, and the mounting of cutterbar 32 (or crop pick-up means) directly in front of auger 36.

I claim:

1. A combine harvester crop gathering table including an upper rear table support beam, a table floor the upper surface of which forms an auger trough, a rear wall connected to the table support beam and to the table floor, an end wall at each end of the table secured to the upper rear table support beam the table floor and the rear wall, a cutterbar assembly mounted on the forward portion of the crop gathering table and extending from one end wall to the other end wall, a crop outlet opening in the rear wall, and an auger 36 rotatably journaled on the two end walls for receiving crop material, for conveying crop material along the auger trough and for conveying crop material through the crop outlet opening in the rear wall of the table, said auger including a hollow auger shaft with a center axis of rotation, auger flighting attached to the outer surface of the hollow auger shaft on each end of said hollow auger shaft for conveying crop material from the adjacent end wall to the crop outlet opening, and a plurality of crop feeding plates attached to the hollow auger shaft generally parallel to the center axis of rotation of the hollow auger shaft and extending outwardly from the axis of rotation of the hollow auger shaft a distance substantially less than the outer free edges of the auger flighting to pull crop material into the auger trough without impeding movement along the auger trough toward the crop outlet opening.

2. The combine harvester crop gathering table of claim 1 wherein the crop feeding plates are mounted at 180 degree intervals about the center axis of rotation of the hollow auger shaft.

3. The combine harvester crop gathering table of claim 1 wherein the crop feeding plates are uniformly spaced about the center axis of rotation of the hollow auger shaft.

4. The combine harvester crop gathering table of claim 1 wherein the outer free edge of the auger flighting is at least twice as far from the adjacent outer surface of the auger shaft as the outer free edge of each crop feeding plate.